US009103487B2

(12) United States Patent
Hale et al.

(10) Patent No.: US 9,103,487 B2
(45) Date of Patent: Aug. 11, 2015

(54) ADJUSTABLE MOUNTING CLIP AND SYSTEM USING SAME (71) Applicant: DayMen US, Inc., Petaluma, CA (US)

(72) Inventors: Eric C. Hale, San Francisco, CA (US); Noah Balmer, Oakland, CA (US); David Yao, San Francisco, CA (US)

(73) Assignee: Daymen US, Inc., Petaluma, CA (US)

( * ) Notice: Subject to any disclaimer, the term of this patent is extended or adjusted under 35 U.S.C. 154(b) by 0 days.

(21) Appl. No.: 13/665,934

(22) Filed: Nov. 1, 2012

(65) Prior Publication Data

US 2014/0097306 A1    Apr. 10, 2014

Related U.S. Application Data

(60) Provisional application No. 61/615,273, filed on Mar. 24, 2012.

(51) Int. Cl.
| | |
|---|---|
| A47F 5/00 | (2006.01) |
| F16M 13/02 | (2006.01) |
| H04M 1/04 | (2006.01) |
| F16M 11/04 | (2006.01) |
| F16M 13/00 | (2006.01) |

(52) U.S. Cl.
CPC ............ F16M 13/022 (2013.01); F16M 11/041 (2013.01); F16M 13/00 (2013.01); H04M 1/04 (2013.01)

(58) Field of Classification Search
CPC ...... F16M 11/10; F16M 11/041; F16M 11/38
USPC ................ 248/122.1, 346.07, 346.03, 346.04
See application file for complete search history.

(56) References Cited

U.S. PATENT DOCUMENTS

| | | | | |
|---|---|---|---|---|
| 2,164,299 | A * | 6/1939 | Mandell et al. | 40/741 |
| 5,457,745 | A | 10/1995 | Wang | |
| 5,903,645 | A | 5/1999 | Tsay | |
| 8,413,943 | B1 * | 4/2013 | Li | 248/454 |
| 8,550,421 | B2 * | 10/2013 | Liu | 248/455 |
| 2007/0262223 | A1 * | 11/2007 | Wang et al. | 248/346.07 |
| 2007/0284500 | A1 | 12/2007 | Fan | |
| 2009/0224113 | A1 * | 9/2009 | Voorhees | 248/122.1 |
| 2011/0290975 | A1 * | 12/2011 | Lin | 248/346.04 |

* cited by examiner

*Primary Examiner* — Bradley Duckworth
(74) *Attorney, Agent, or Firm* — Michael A. Guth (57) ABSTRACT

An adjustable mounting clip for an electronic device, such as a cellular telephone or smart phone. The mounting clip may be adapted to be supported by a flexible support apparatus, such as a tripod. The mounting clip may support a variety of electronic device types with an automatically adjusting variable device receiver. The mounting clip may be adapted to retract into a compact stowed position when not in use.

10 Claims, 15 Drawing Sheets

ADJUSTABLE MOUNTING CLIP AND SYSTEM USING SAME

CROSS-REFERENCE TO RELATED APPLICATIONS

This application claims priority to U.S. Provisional Patent Application No. 61/615,273 to Hale, filed Mar. 24, 2012, which is hereby incorporated by reference in its entirety.

BACKGROUND

1. Field of the Invention

The present invention relates to an adjustable mount, and a system using a flexible support apparatus, such as a tripod, adapted to support an item mounted in the adjustable mount.

2. Description of Related Art

Modern portable electronic devices, such as cellular telephones, may now be used for viewing as well. However, these items are typically small, flat, rectangular objects which may be difficult to place in an appropriate position for hands-free use while viewing. Also, these devices may come in a variety of sizes, such that a mounting clip may need to be adjustable in order to offer the versatility needed to support different devices.

The use of a portable electronic device may be enhanced with the use of a tripod or other support structure. An adjustable clip adapted to work with varying types of support structures may enhance its versatility.

What is called for is an adjustable mount which may adjust to support a variety of different types and sizes of modern devices, such as smart phones. What is also called for is an adjustable mount or clamp which allows the mounting of the device to a support structure such as a tripod.

SUMMARY

The present invention is directed towards an adjustable mounting clip for an electronic device, such as a cellular telephone or smart phone. The mounting clip may be adapted to be supported by a flexible support apparatus, such as a tripod. The mounting clip may support a variety of electronic device types with an automatically adjusting variable clip receiver.

DETAILED DESCRIPTION

FIGS. 1A-E illustrate an adjustable mounting clip 10 according to some embodiments of the present invention. In some embodiments, the adjustable mounting clip is adapted to support an electronic device such as a smart phone. The electronic device may also be a GPS device, a remote monitor, or other device. In some embodiments, an adjustable mounting clip 10 has a first gripping clip 11 and a second gripping clip 12. The adjustable mounting clip 10 is adapted to attach to a support structure such as a tripod, or a flexible tripod, in some embodiments. A central portion 13 adapted to extendably join the first gripping clip 11 and the second gripping clip 12. The central portion may allow for extension between the first gripping clip 11 and the second gripping clip 12 along guides 14, 15, which may include a spring loaded retraction aspect adapted to keep pressure on a device held by the adjustable mounting clip. The first gripping clip 11 and the second gripping clip 12 may also be spring loaded such that they fold inward into a stowed configuration when not supporting an electronic device.

The first gripping clip 11 may have resilient portions 16 adapted to provide friction against the device held by the adjustable mounting clip 10. The second gripping clip 12 may have resilient portions 17 adapted to provide friction against the device held by the adjustable mounting clip 10. The resilient portions 16, 17 may reside in inset portions of the gripping clips 11, 12 in some embodiments. In some embodiments, the gripping clips 11, 12 may be made of plastic. In some embodiments, the resilient portions 16, 17 may be co-molded to the gripping clips 11, 12.

The first gripping clip 11 may have a threaded insert 18 adapted to receive a threaded post, such as may be found on a tripod, or on a removable clip adapted to be inserted into a clip receiver, as may be found on a tripod. The first gripping clip 11 may have a lanyard hole 19 which may be used to attach a lanyard which can be used to attach the adjustable mounting clip to another item.

Figure 1A:
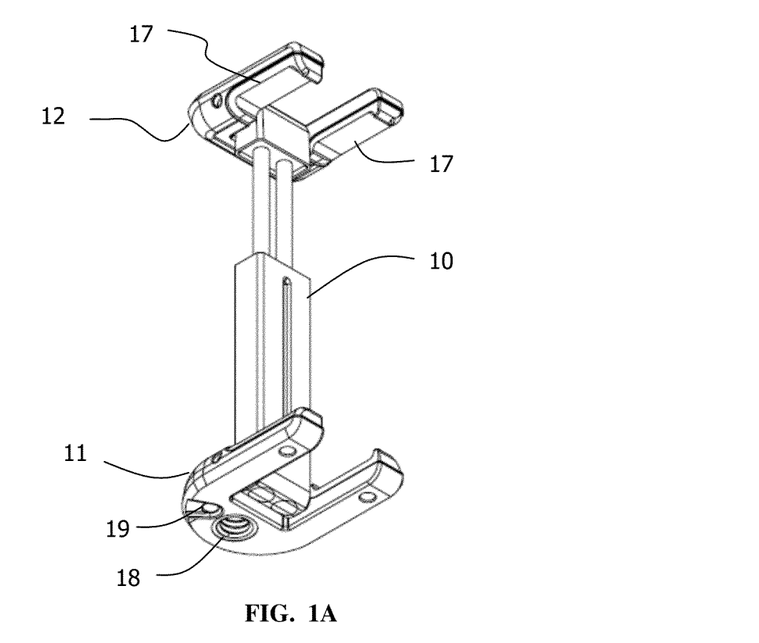
FIGS. 1A-E illustrate an adjustable mounting clip in a deployed configuration according to some embodiments of the present invention.
Figure 1B:
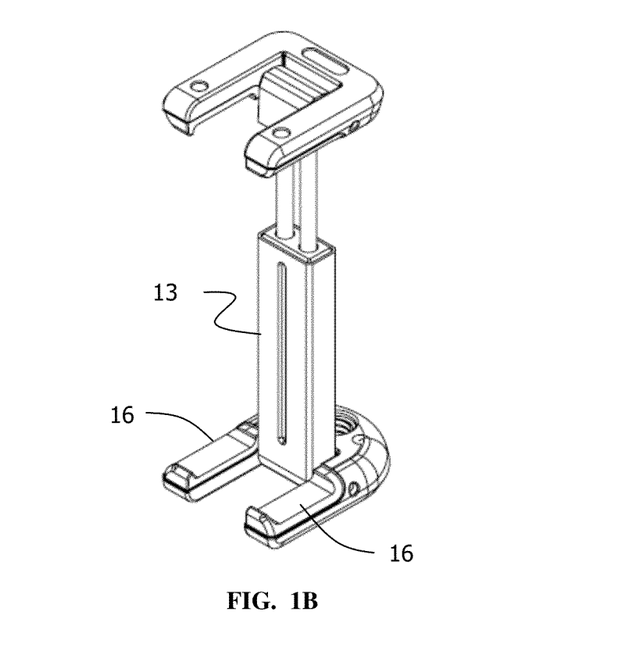
Figure 1C:
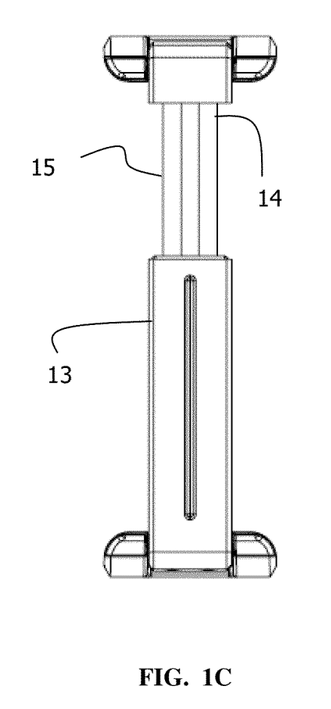
Figure 1D:
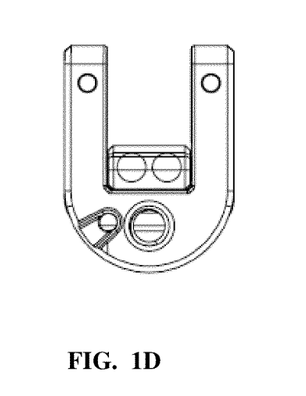
Figure 1E:
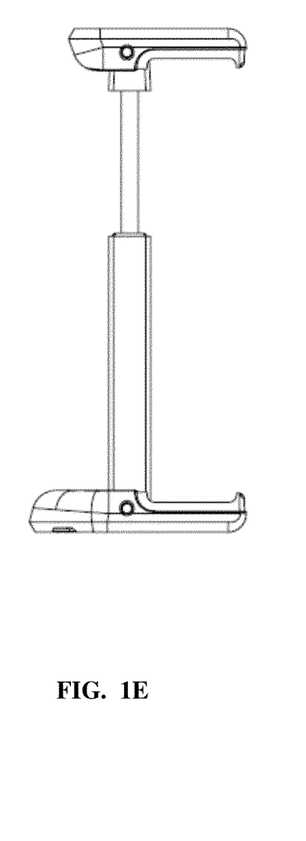
Figure 2:
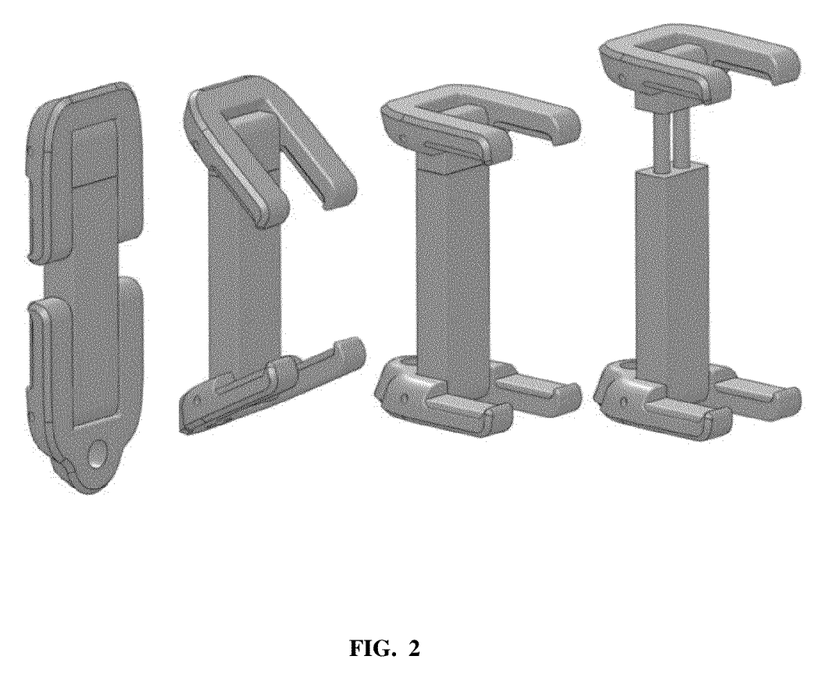
FIG. 2 illustrates an adjustable mounting clip as it transitions from a stowed to a deployed configuration according to some embodiments of the present invention.

FIG. 2 illustrates an adjustable mounting clip 10 in various states as it would be taken from a stowed configuration to a deployed configuration. In a fully stowed configuration, the adjustable mounting clip 10 may be adapted to take a very small amount of space, lending well to storage in small spaces, such as the pocket of a user. The gripping clips may be in a U-shape, such that the gripping clips, when folded into a stowed configuration, reside outside of the central portion 13. The gripping clips 11, 12 may reside in plane with the central portion 13 when stowed, such that the stowed configuration is extremely compact. In some embodiments, the adjustable mounting clip 10 is spring loaded such that the gripping clips 11, 12 are brought together under spring force. The gripping clips 11, 12 may be extended from each other by the user, in order to be of a proper size for a held device. Once the user is no longer pulling the two ends away from each other, the spring loaded aspect of the adjustable mounting clip will then close down on the device being held. The combination of the spring loaded aspect of the clip, and the resilient portions of the gripping clips, allow for a very sure grip of the held device.

The use of an adjustable mounting clip gives the distinct advantage of allowing the user to hold and position an electronic device, such as a smart phone, in a convenient position for viewing. For example, the adjustable mounting clip may be mounted to a tripod which may be placed upon a table, or an airplane seat's foldout tray, for viewing and use. The expandable aspect of the central portion 13 allows for use with a variety of sizes of electronic devices.

Figure 3A:
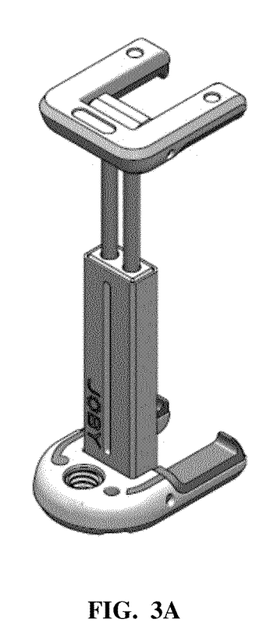
FIGS. 3A-B illustrate an adjustable mounting clip in a deployed configuration according to some embodiments of the present invention.
Figure 3B:
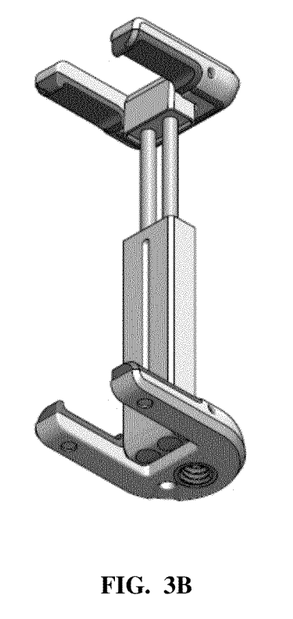
Figure 4A:
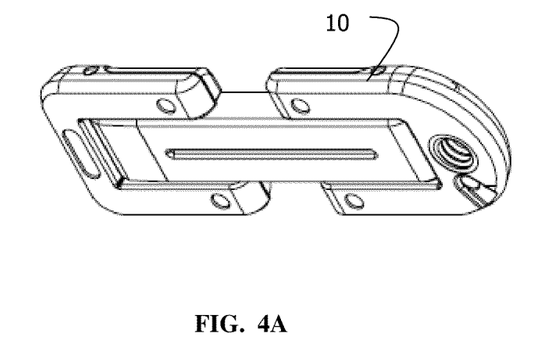
FIGS. 4A-F illustrate an adjustable mounting clip in a stowed configuration according to some embodiments of the present invention.
Figure 4B:
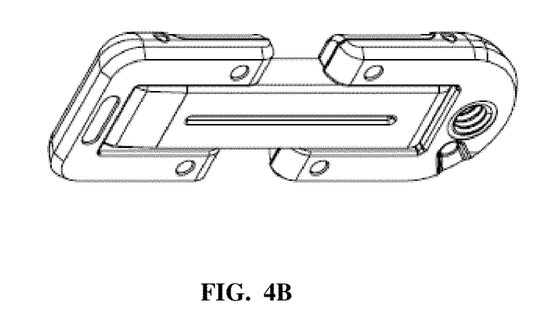
Figure 4C:
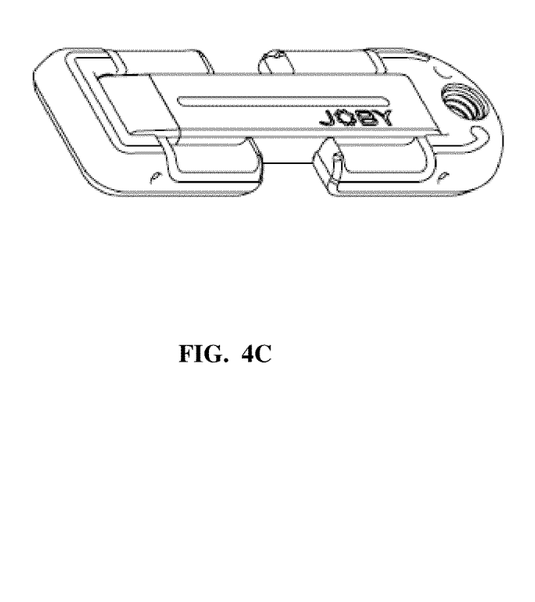
Figure 4D:
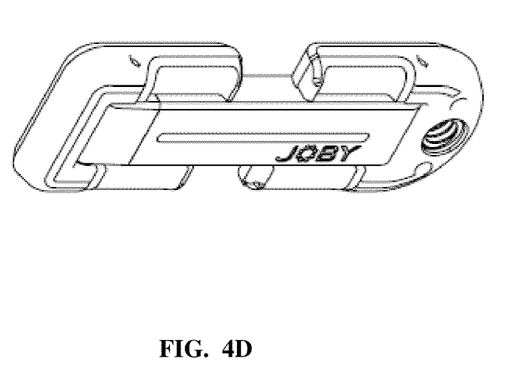
Figure 4E:
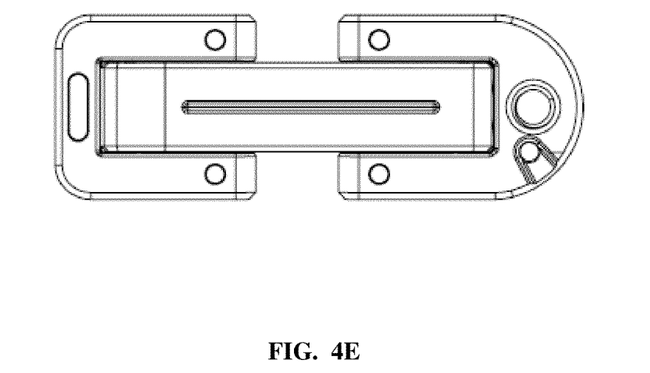
Figure 4F:
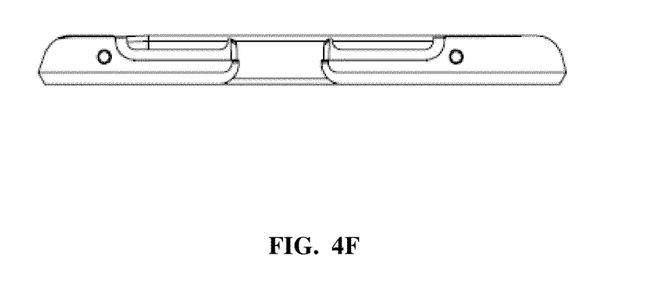

FIGS. 3A and 3B illustrate an adjustable mounting clip 10 in perspective views according to some embodiments of the present invention. The adjustable mounting clip 10 is adapted to receive and hold an electronic device, or other device. A central portion 13 adapted to extendably join the first gripping clip 11 and the second gripping clip 12. The central portion may allow for extension between the first gripping clip 11 and the second gripping clip 12 along guides 14, 15, which may include a spring loaded retraction aspect adapted to keep pressure on a device held by the adjustable mounting clip. One or more of the guides 14, 15 may include a spring system adapted to apply a contracting force between the first gripping clip 11 and the second gripping clip 12.

FIGS. 4A-F illustrate an adjustable mounting clip in a stowed configuration according to some embodiments of the present invention. The way in which the parts integrate into a stowed whole allows for storage in a small space. The gripping clips 11, 12 may be adapted to pivot from a stowed position parallel to the central portion 13 to a deployed position perpendicular to the central portion 13. The gripping clips 11, 12 may be U-shaped such that in the stowed position the clips reside outside of the central portion, allowing for a very compact co-planar stowed position.

Figure 5A:
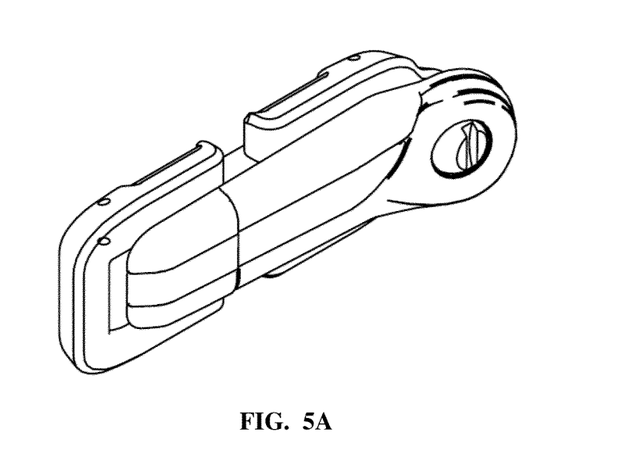
FIGS. 5A-C illustrate an adjustable mounting clip mounted onto a tripod in a stowed position according to some embodiments of the present invention.
Figure 5B:
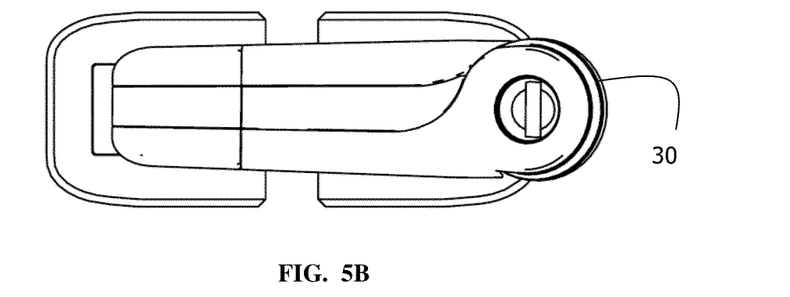
Figure 5C:
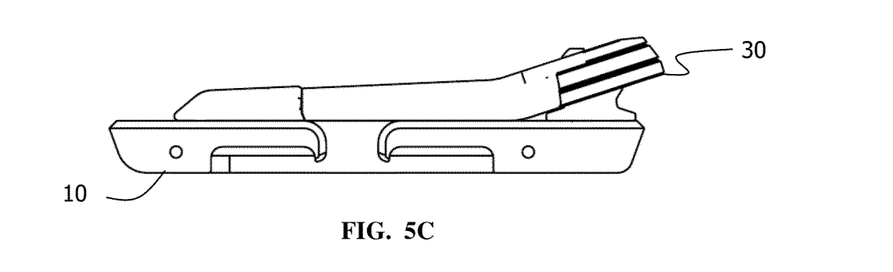

FIGS. 5A-C illustrate an adjustable mounting clip 10 attached to a small folded tripod 30, such as a miniature ball tripod, according to some embodiments of the present invention. The tripod may have a plurality of legs which may fold together in order to form a small stowed unit of clip and tripod. The adjustable mounting clip is adapted to receive an electronic device. The combination of the adjustable mounting clip 10 and the small folded tripod 30 present a very compact system adapted to hold a device. In some embodiments, the tripod 30 has three legs which rotate around a center ball such that the three legs are parallel when in a stowed position. The tripod may have a threaded post which mates into the threaded insert 18 of the adjustable mounting clip. With the adjustable mounting clip in a stowed configuration, the tripod and the clip may align such that the long axis of the stowed clip is parallel to the long axis stowed tripod.

Figure 6A:
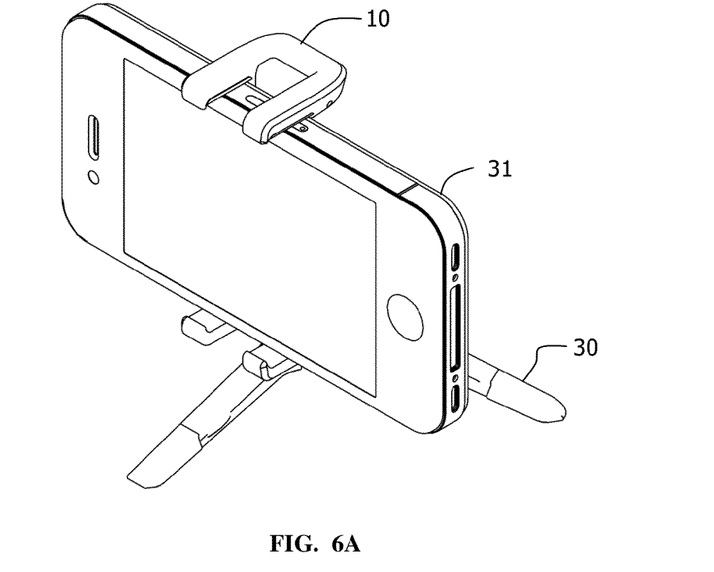
FIGS. 6A-B illustrate an adjustable mounting clip mounted onto a tripod in a deployed position supporting an electronic device according to some embodiments of the present invention.
Figure 6B:
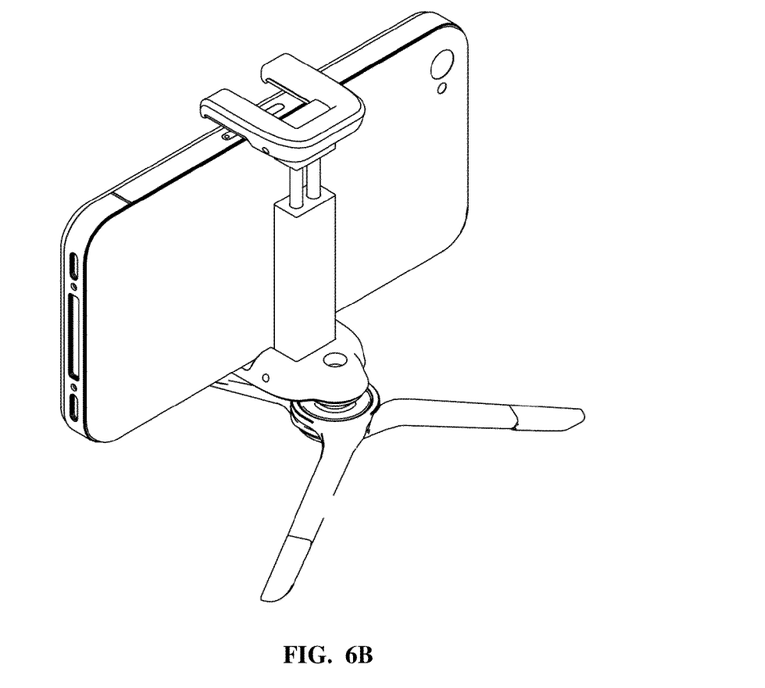

In some embodiments of the present invention, the tripod legs are adapted to rotate from a first position, which is a closed, or stowed, configuration and seen in FIGS. 5A-C, to an open, or deployed, position as seen in FIGS. 6A-B. In some embodiments, the tripod legs may have tips which may be of a material adapted to provide more friction while in use.

In some embodiments, the stowed position of the tripod places the legs directly adjacent such that they are stowed together into a unitary stowed leg assembly. The rings of the ends of the legs may be adapted such that when in a deployed position the rings have stops which prevent further rotation of the legs past a point which places the legs in a tripod configuration.

A central body ring provides an external surface adapted to provide a support and guide surface to the ends of the legs, which may be rings adapted to fit around the central body ring. Within the central body ring there may be a socket adapted to receive a ball connector. The ball connector may be spherical in its contact area with the socket. A threaded post may protrude from the ball connector and be adapted to support a device such as a camera, or to mate to an adjustable mounting clip, or other device. The rings of the legs may have sufficient friction with the central body ring such that the legs may be rotated into either a stowed or a deployed configuration, but will stay in the position under typical usage loads. The ball connector may have sufficient friction with the socked of the interior of the central body ring such that once placed in a selected position the ball tends not to move during typical use.

FIGS. 6A-B illustrate an adjustable mounting clip 10 holding an electronic device 31 mounted onto a miniature ball tripod 30. The ball tripod 30 is in a deployed configuration wherein the legs have been rotated into a position adapted to support the system. An apparatus such as this affords the user the convenience of using a tripod as a support stand for watching video on a personal player, for example, and the use of the adjustable mounting clip allows the user to custom tailor their system for the player being viewed.

Figure 7A:
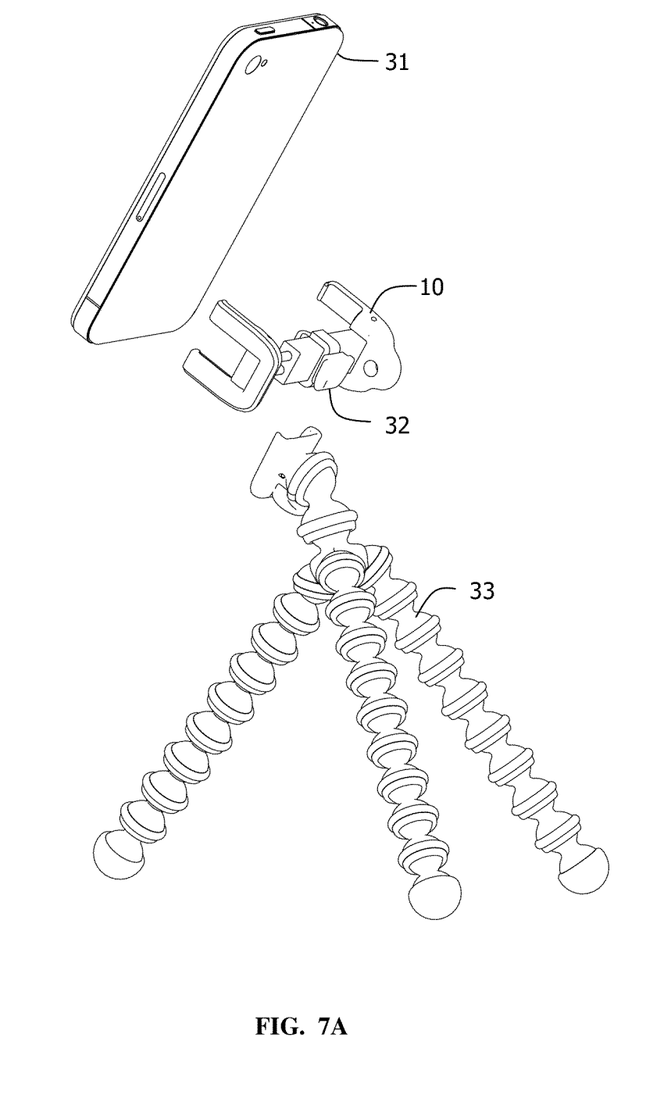
FIG. 7A is an exploded view of an adjustable mounting clip mounted onto a flexible tripod supporting an electronic device according to some embodiments of the present invention.
Figure 7B:
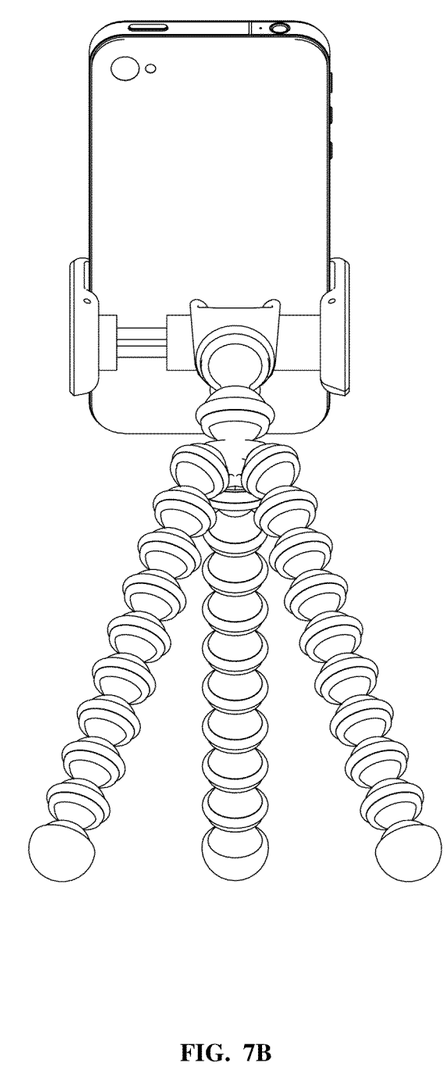
FIG. 7B illustrate an adjustable mounting clip mounted onto a flexible tripod supporting an electronic device according to some embodiments of the present invention.

FIGS. 7A-B illustrate an adjustable mounting clip 10 with a clip 32 mounted onto a flexible tripod 33 according to some embodiments of the present invention. The clip 32 may be adapted to attach to the adjustable mounting clip 10 along the central portion 13. The flexible tripod may have a body portion, which provides a base of support for three flexible legs. The flexible legs may consist of a series of interconnected ball and socket joint connectors. The flexible legs are able to be flexed into a variety of positions and can be used to support the body portion by forming tripod support. The flexible legs are able to adapt to uneven surfaces to allow the tripod to function in a variety of situations. The body portion itself may have a series of interconnected ball and socket joint connectors within it, allowing for even more flexibility with regard to its mounting function.

Although the flexible legs are illustrated as functioning legs, the legs are of sufficient flexibility that the may be used to wrap around items such as bars or other objects in order to fasten the tripod apparatus to objects that would not be suitable for mounting of a typical tripod. In conjunction with the gripping portion, this allows the tripod apparatus to be fastened to a variety of objects. For example, when used to position a digital camera, the legs may wrap around a vertical gate rail, allowing the mounting of the camera for a photo taking opportunity not previously available.

Figure 8A:
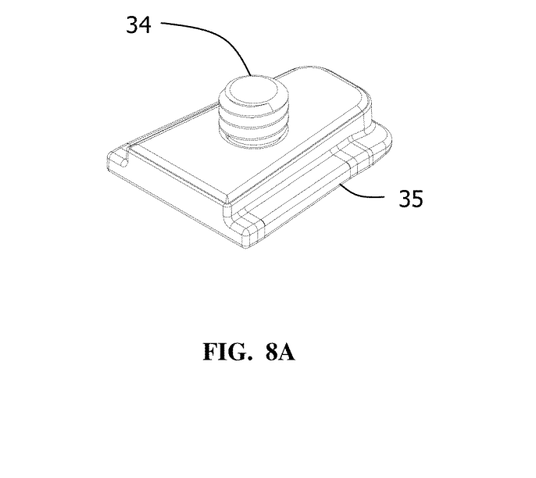
FIG. 8A illustrates a mounting clip used in some embodiments of the present invention.

In some embodiments, the body portion is connected to an interconnect portion adapted to receive a clip 35, illustrated in FIG. 8A. A clip 35 may be removably fastened to the interconnect portion. The clip 35 may have a threaded post 34 adapted to fit into a camera or other device in some embodiments.

In some embodiments, the flexible legs may use connectors that have a co-molded gripping portion. The gripping portions may allow for use of the tripod in a variety of ways, including wrapping of the legs around a post or other object. In some embodiments, the flexible legs may be terminated with a gripping pod. The gripping pod may be fully molded into the cavity of the connector.

Figure 8B:
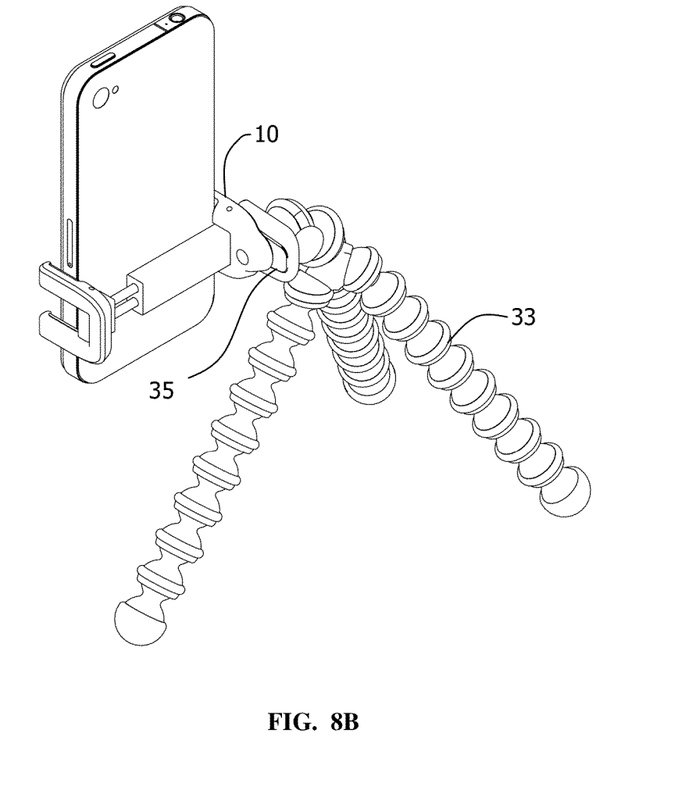
FIGS. 8B-C illustrate an adjustable mounting clip mounted onto a flexible tripod while supporting an electronic device according to some embodiments of the present invention.
Figure 8C:
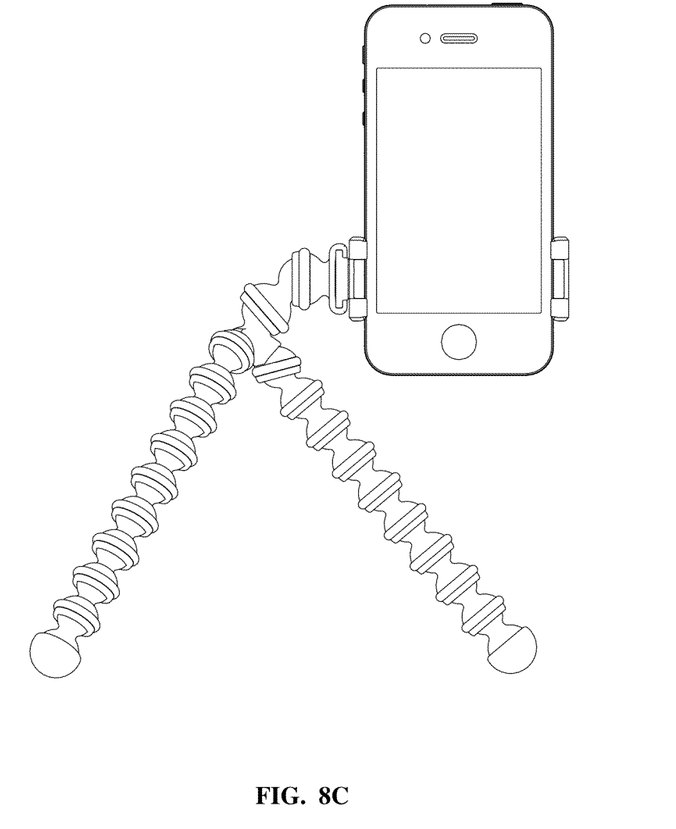

FIGS. 8B-C illustrate further uses of an adjustable mounting clip with a tripod mounting clip attached thereto, clipped in the clip receiver of a tripod with flexible legs.

Figure 9:
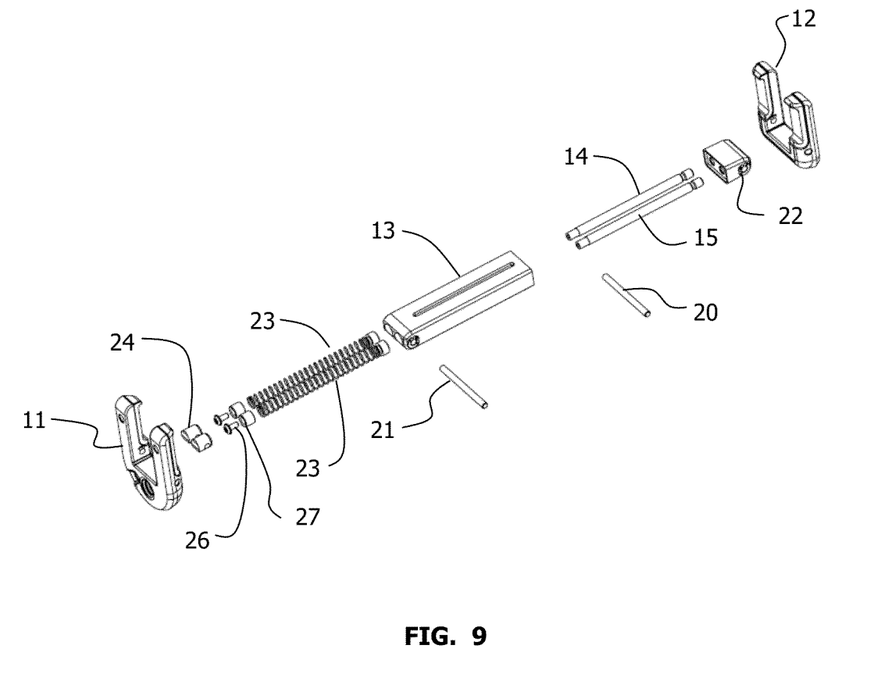
FIG. 9 is an illustration of components of an adjustable mounting clip according to some embodiments of the present invention.

FIG. 9 is an illustrative exploded view of an adjustable mounting clip 10 according to embodiments of the present invention. The first gripping clip 11 is pivotally attached to an end of the central portion 13 by a pin 21. The second gripping clip 12 is pivotally attached to a slider end 22 by a pin 22. The guides 14, 15 are adapted to slide within the central portion 13 while attached at a first end to the slider end 22. Springs 23 surround the guides 14, 15 and are adapted to retract the adjustable mounting clip 10 such that is places moderate pressure on a supported device while supporting it, or to pull the clip into the stowed configuration when no device is held within it. End attachments 24, 26, 27 are used to restrain a second end of the springs such that they restrain extension of the second end 12 from the first end 11.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

We claim:

1. An adjustable mounting clip for an electronic device, said adjustable mounting clip comprising:
   a middle portion, said middle portion extendable along a first axis;
   a first gripping clip, said first gripping clip comprising one or more device mounting surfaces, said first gripping clip pivotally attached to a first end of said middle portion along a first pivot axis, said first gripping clip adapted to pivot from a stowed position wherein said one or more device mounting surfaces are parallel to said first axis to a deployed position wherein said one or more device mounting surfaces are perpendicular to said first axis; and
   a second gripping clip, said second gripping clip comprising one or more device mounting surfaces, said second gripping clip pivotally attached to a second end of said middle portion along a second pivot axis, said second gripping clip adapted to pivot from a stowed position wherein said one or more device mounting surfaces are parallel to said first axis to a deployed position wherein said one or more device mounting surfaces are perpendicular to said first axis,
   wherein said adjustable mounting clip is adapted to hold a planar device along a first mounting plane parallel to said first axis, and wherein said first pivot axis and said second pivot axis are parallel to said first mounting plane.

2. The adjustable mounting clip of claim 1 wherein said extension of said middle portion is resisted with a spring within said middle portion.

3. The adjustable mounting clip of claim 1 wherein said first gripping clip comprises a resilient portion along a device mounting surface of said first gripping clip.

4. The adjustable mounting clip of claim 3 wherein said second gripping clip comprises a resilient portion along a device mounting surface of said second gripping clip.

5. The adjustable mounting clip of claim 1 wherein said first gripping clip further comprises two gripping fingers, wherein a first gripping finger resides alongside a first side of said of said middle portion and a second gripping finger resides alongside a second side of said middle portion when said first gripping clip is in a stowed position.

6. The adjustable mounting clip of claim 5 wherein said second gripping clip further comprises two gripping fingers, wherein a first gripping finger resides alongside a first side of said of said middle portion and a second gripping finger resides alongside a second side of said middle portion when said second gripping clip is in a stowed position.

7. A tripod and adjustable clip system comprising:
   a tripod; and
   an adjustable mounting clip, said adjustable mounting clip comprising:
      a middle portion, said middle portion extendable along a first axis;
      a first gripping clip, said first gripping clip comprising one or more device mounting surfaces, said first gripping clip pivotally attached to a first end of said middle portion along a first pivot axis, said first gripping clip adapted to pivot from a stowed position wherein said one or more device mounting surfaces are parallel to said first axis to a deployed position wherein said one or more device mounting surfaces are perpendicular to said first axis; and
      a second gripping clip, said second gripping clip comprising one or more device mounting surfaces, said second gripping clip pivotally attached to a second end of said middle portion along a second pivot axis, said second gripping clip adapted to pivot from a stowed position wherein said one or more device mounting surfaces are parallel to said first axis to a deployed position wherein said one or more device mounting surfaces are perpendicular to said first axis, wherein said adjustable mounting clip is adapted to hold a planar device along a first mounting plane parallel to said first axis, and wherein said first pivot axis and said second pivot axis are parallel to said first mounting plane.

8. The tripod and adjustable clip system of claim 7 wherein said extension of said middle portion is resisted with a spring within said middle portion.

9. The adjustable mounting clip of claim 7 wherein said first gripping clip further comprises two gripping fingers, wherein a first gripping finger resides alongside a first side of said of said middle portion and a second gripping finger resides alongside a second side of said middle portion when said first gripping clip is in a stowed position.

10. The adjustable mounting clip of claim 9 wherein said second gripping clip further comprises two gripping fingers, wherein a first gripping finger resides alongside a first side of said of said middle portion and a second gripping finger resides alongside a second side of said middle portion when said second gripping clip is in a stowed position.

* * * * *